United States Patent [19]
Stadnick et al.

[11] Patent Number: 6,010,800
[45] Date of Patent: Jan. 4, 2000

[54] METHOD AND APPARATUS FOR TRANSFERRING HEAT GENERATED BY A BATTERY

[75] Inventors: Steven J. Stadnick, Lakewood; Stanley J. Krause, Northridge, both of Calif.

[73] Assignee: Hughes Electronics Corporation, Los Angeles, Calif.

[21] Appl. No.: 09/098,849

[22] Filed: Jun. 17, 1998

[51] Int. Cl.[7] ............................ H01M 10/50; H01M 2/30
[52] U.S. Cl. ............................................ 429/120; 429/178
[58] Field of Search ................................. 429/120, 178, 429/179, 65

[56] References Cited

U.S. PATENT DOCUMENTS

| | | | |
|---|---|---|---|
| 4,189,527 | 2/1980 | Stadnick et al. | 429/26 |
| 4,292,381 | 9/1981 | Klein | 429/120 |
| 4,324,845 | 4/1982 | Stockel | 429/101 |
| 4,600,665 | 7/1986 | Sanders | 429/120 |
| 5,187,030 | 2/1993 | Firmin et al. | 492/120 |

FOREIGN PATENT DOCUMENTS 2-94264  4/1990  Japan .

*Primary Examiner*—Maria Nuzzolillo
*Assistant Examiner*—Jonathan Crepeau
*Attorney, Agent, or Firm*—Terje Gudmestad; Georgann Grunebach; Michael W. Sales

[57] ABSTRACT

An apparatus and method for controlling the temperature of a battery used in a spacecraft or an electric vehicle are disclosed. The apparatus includes a thermal conductor, such as a thermally-conductive heat pipe or forced-fluid cooling loop, that is in thermal contact with thermally-conductive cell terminals of the battery, and a heat sink, such as a radiator. The inventive method includes operating the battery to generate and conduct heat to the thermally-conductive battery cell terminals. The generated heat is passed via conduction from the terminals to the thermal conductor. The heat is conducted through the thermal conductor to a heat sink which may be remotely located with respect to the battery. Preferably, the thermal conductor remains electrically insulated from the battery cell terminals and the heat sink.

17 Claims, 4 Drawing Sheets

METHOD AND APPARATUS FOR TRANSFERRING HEAT GENERATED BY A BATTERY

BACKGROUND OF THE INVENTION

1. Field of the Invention

The invention relates to a heat transfer system for controlling the temperature of a battery. More specifically, the invention relates to a method and apparatus useful in dissipating heat generated by operation of a battery used in, for example, a spacecraft or an electrical vehicle.

2. Brief Description of the Related Art

A battery includes one or more chargeable cells in which heat is generated as a result of normal operation. The cells and other electrical components of a battery are often temperature-sensitive and, therefore, control of the battery temperature is crucial to its safe and efficient operation. Typically, generated heat is dissipated from the cells of a battery via conductive heat transfer through a battery casing and thermal conductors which envelope the cells and other electrical components of the battery. Heat generated within the cell interconnects or electrodes is conducted away from cell terminals of the battery to the electrodes, from the electrodes across an electrical insulation gap to the cell case, and from the cell case to the battery case, and then to the heat sink (e.g., a radiator).

Dissipation of generated heat via the aforementioned route is convenient because each of the cell terminals, electrodes, and cell interconnects is a necessary electrical component of a battery regardless of how little heat must be dissipated. For a fifteen kilowatt spacecraft, the thermal conduction path external to the cell is used only for controlling the temperature of the battery and weighs about sixty pounds.

Conductive heat transfer via the aforementioned route is suitable in situations where the weight of the battery is not a concern. However, where the weight of the battery is a concern, the typical heat conduction paths impose restrictions on the use of the battery in certain applications. Such a weight restriction exists when a battery is used in a spacecraft where each unit of weight corresponds to an incremental unit of cost. For example, the cost to transport one pound of hardware into space is about $20,000 (1998 dollars). Thus, the benefits of any weight reduction would immediately result in a substantial cost savings.

In spacecraft, the battery is located immediately adjacent the heat sink to minimize the pathway to heat dissipation. For example, batteries in spacecraft are most often disposed at the periphery of the spacecraft such that the batteries may be in close thermal contact with an external radiator that dissipates heat into space. The design of spacecraft is somewhat limited in that as spacecraft become larger and are designed to employ more features requiring battery power, it becomes more difficult to effectively cool batteries not disposed at the periphery of the spacecraft. Difficulties include a lengthy and inefficient heat dissipation path, a need for additional cooling equipment, and the added weight that accompanies additional equipment. It is not always practical, nor always possible, to orient battery-powered features and, more importantly, the battery in close proximity to heat sinks located at the periphery of a spacecraft.

It would be desirable to provide an improved method of controlling and dissipating the heat generated by operation of a battery. Furthermore, it would be desirable to eliminate the necessity of a heavy thermal conductor within the battery, yet provide a suitable means for controlling and dissipating the heat generated within the battery. Additionally, it would be desirable to provide a weight-conservative apparatus capable of suitably controlling and dissipating the heat generated by operation of the battery. Still further, it would be desirable to provide a method and apparatus for cooling a battery remotely located with respect to a heat sink.

SUMMARY OF THE INVENTION

It is an object of the invention to overcome one or more of the problems described above.

The invention is directed to a method and an apparatus for transferring heat generated in a battery. The method includes the step of providing a thermal conductor, such as a thermally-conductive heat pipe (or a forced-fluid cooling loop) partially filled with a heat transfer fluid, wherein the conductor is disposed in thermal contact with at least one thermally-conductive battery cell terminal of each battery cell and a heat sink, the conductor being electrically insulated from the terminal. The method further includes the step of operating the battery to generate heat, conducting the heat to the terminal(s) such that the generated heat is conducted through the conductor to the heat sink. For example, the generated heat heats or vaporizes a portion of the fluid in the heat pipe or cooling loop and the heat sink cools or condenses the heated or vaporized fluid.

The apparatus includes a heat sink, a thermal conductor, such as a thermally-conductive heat pipe or forced-fluid cooling loop, in thermal contact with at least one thermally-conductive battery cell terminal and the heat sink, the conductor (i.e., the pipe or loop) being electrically-insulated from the terminal and, preferably, the heat sink.

The invention reduces the difficulties and disadvantages of the prior art by providing a weight-conservative, relatively simple, and highly efficient method of controlling the operating temperature of a battery used in spacecraft and electrical vehicles. Furthermore, the invention provides a lightweight apparatus for controlling the operating temperature of the battery. The weight reduction, in turn, provides significant savings over conventional apparatus used to control the temperature of a battery used in spacecraft and electrical vehicles. The invention also allows for the design of large spacecraft and electrical vehicles wherein the battery need not be disposed adjacent the heat sink near the periphery of the spacecraft or vehicle.

Other aspects and advantages of the invention will become apparent to those skilled in the art from a review of the following detailed description, taken in conjunction with the drawings and the appended claims.

DETAILED DESCRIPTION OF THE INVENTION

Figure 1:
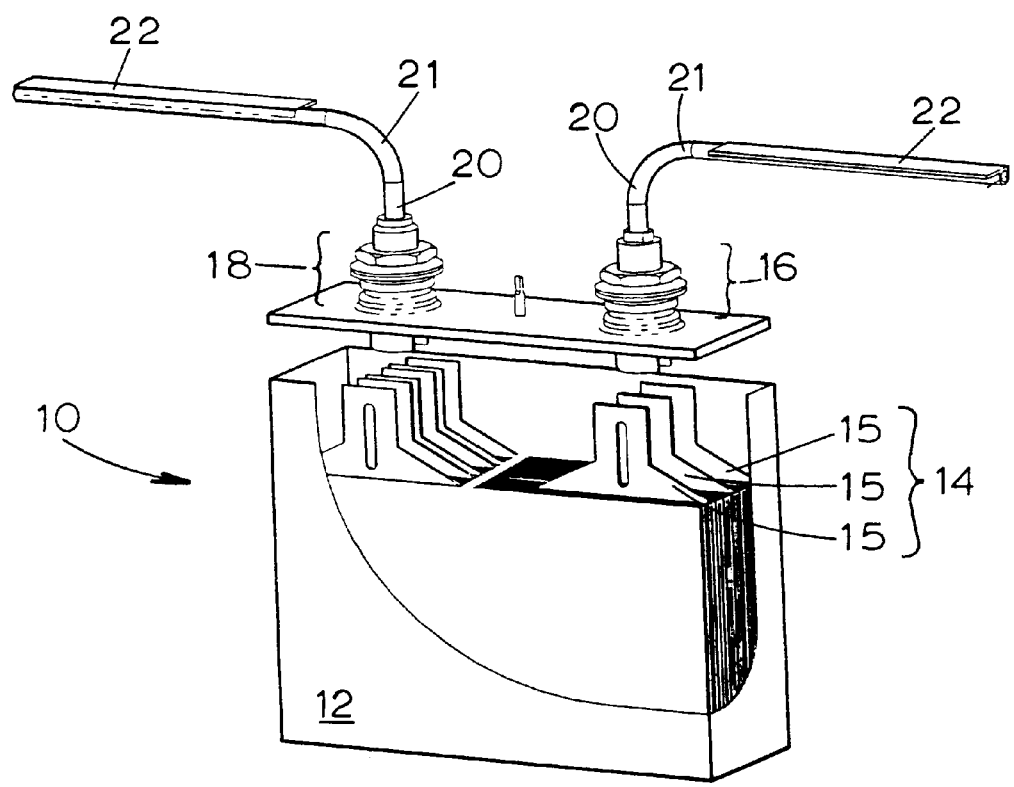
FIG. 1 is a partial, exploded view of a battery cell and heat control system according to the invention.

The invention is directed to a method and an apparatus for transferring heat generated in a battery. The method includes the step of providing a thermal conductor, such as a thermally-conductive heat pipe (or a forced-fluid cooling loop) partially filled with a heat transfer fluid, wherein the conductor is disposed in thermal contact with at least one thermally-conductive battery cell terminal and a heat sink. The conductor also is electrically-insulated from the terminal(s) and, preferably, the heat sink. The method further includes the step of operating the battery to generate heat, and conducting the heat to the terminal(s) such that the generated heat is passed through the conductor to the heat sink. For example, the generated heat heats and/or vaporizes a portion of the fluid in the heat pipe or cooling loop and the heat sink cools and/or condenses the heated or vaporized fluid.

Additionally, the invention is directed to an apparatus for transferring heat generated in a battery. The apparatus includes a heat sink, a thermal conductor, such as a thermally-conductive heat pipe or forced-fluid cooling loop, in thermal contact with at least one thermally-conductive battery cell terminal and the heat sink, the conductor (i.e., the pipe or loop) being electrically insulated from the terminal and, preferably, the heat sink. As discussed more fully below, proper care should be taken to ensure that the heat pipe (or loop) remains electrically insulated from the battery cell terminal(s).

A heat pipe for use according to one embodiment of the invention is a vacuum-tight vessel that is evacuated and partially filled with a volatile heat transfer fluid. The heat pipe is characterized by an extremely high thermal conductance attributable in part to a process of vapor state heat transfer. The heat transfer fluid absorbs its latent heat of vaporization via conductive heat transfer at an end of the pipe (referred to hereafter as the "evaporator area") in thermal contact with the battery heat sources. The vaporized fluid creates a pressure gradient in the pipe forcing the vapor to flow along the pipe to a cooler area (referred to hereafter as the "condenser area") of the pipe, where the vaporized fluid condenses, releasing the latent heat of vaporization. A portion of the condenser area of the pipe is in thermal contact with a heat control system (referred to hereafter as a "heat sink"). An exemplary heat sink for use in spacecraft comprises an aluminum fin which radiates heat into space, the fin being cooled by the space environment. The condensed heat transfer fluid returns from the condenser area to the evaporator area by capillary forces developed in a porous and/or grooved wick structure of the heat pipe. For a general description of the fluid flow phenomena occurring within a heat pipe, see KIRK OTHMER'S ENCYCLOPEDIA OF CHEMICAL TECHNOLOGY, vol. 12, pgs. 1011–21 (John Wiley & Sons, Inc., New York, 1996), and the references cited therein.

Generally, any thermal conductor capable of sufficiently conducting heat within a temperature range of about −40° C. to about 60° C. is suitable according to the invention. Wick structures commonly used in heat pipes include a porous, or a fine-mesh, woven screen rolled into an annular structure or channels extruded into the inner surface of the pipe. The heat pipe and its internal wick structure are preferably constructed of a material that is inert with respect to the heat transfer fluid. For example, each of aluminum, iron, stainless steel, carbon steel, nickel, and copper is a suitable material of construction for the thermal conductor (e.g., heat pipe and wick). Suitable heat transfer fluids for use in the heat pipe include liquids having a substantial vapor pressure within the aforementioned temperature range of about −40° C. to about 60° C. Suitable heat transfer fluids include ammonia and Freon-®21, (dichlorofluoromethane) with ammonia being the preferred heat transfer fluid. The amount of heat transfer fluid disposed in the pipe is generally determined by the amount of heat expected to be transferred over a set time period. However, due to the unpredictability of the amount of heat that could be generated and in order to be prepared in the event that the battery overheats, a small excess of heat transfer fluid preferably is present.

According to another embodiment, a forced-fluid cooling loop (e.g., a forced-fluid heat transfer pipe) may be useful to transfer heat generated by the battery to a remotely located heat sink. By "remotely located" it is meant that the distance between the battery and the heat sink is in excess of about 12 inches. Such a forced-fluid cooling loop is especially useful in large spacecraft or electrical vehicles where the battery is not placed at or near the periphery of the spacecraft or vehicle. In such a design, it is necessary to have a lengthy, thermally efficient, and weight-conservative apparatus for transferring heat. The forced-fluid loop which may be constructed of the same material and may contain same or similar heat transfer media as the heat pipe is such an apparatus. The forced-fluid cooling loop is in thermal contact with, but electrically-insulated from, the battery cell terminals and, preferably, the heat sink.

Sources of heat generation during operation of a battery include, but are not limited to, electrochemical heat generated within the cell and conducted to the cell terminals, relays, cell open circuit bypass diodes, cell interconnects, and charge control electronics to maintain charge or discharge control or to boost or reduce cell voltages to desired levels. Some types of batteries, such as nickel hydride, nickel metal hydride, and nickel cadmium batteries have each of the aforementioned heat sources. The heat pipe and forced-fluid cooling loop for use in accordance with the invention may be placed into thermal contact with any or all of the various battery heat sources. However, according to the invention, most of the aforementioned heat sources conduct heat through the battery cell terminals and, therefore, the thermal conductor should be placed into thermal contact with the battery cell terminals. Heretofore battery cell terminals were not designed to be thermally-conductive. However, the applicants have found advantages in using cell terminals that are specifically designed to conduct heat.

Each terminal of the battery and leads is designed to function as both an electrical conductor and a thermal conductor. The terminals are defined by a cavity designed to receive an end of a thermal conductor (e.g. a heat pipe or forced-fluid cooling loop, or for very short distances, any other thermal conductor). According to the invention, the thermal conductor should be electrically-insulated from certain battery heat sources such as, for example, the cell terminals of the battery. A more detailed disclosure regarding the particulars of providing adequate electrical insulation between the thermal conductor and the battery cell terminals and the specific design features of such terminals is provided in and is the subject of co-filed, co-pending, and commonly-owned U.S. patent application Ser. No. 09/098,850 of Steven J. Stadnick, Allen R. Powers, and Barry G. Gage, entitled "Battery Cell Terminal", which is incorporated herein by reference. Preferably, the heat sink also is electrically insulated from the thermal conductor, thereby providing two layers of electrical insulation between the electrical potential of the cell terminal and spacecraft ground.

For purposes of the invention, it is sufficient to understand that the thermal conductor is electrically insulated from the terminals with an electrically-insulating sleeve disposed or deposited on an outer surface of the conductor. The insulating sleeve may include an anodic coating which is a heavy, stable film of oxides known to have excellent corrosion resistance, suitable thermal conductivity characteristics, and suitable electrical insulation properties. Due to the suitable thermal conductivity characteristics of the electrical insulation, the conductor effectively remains in thermal contact with the battery cell terminal. The insulating sleeve may comprise a sprayed-on Mylar® or polysulfone material, both of which also have suitable thermal conductivity characteristics. The insulating sleeve preferably includes a heat conductive adhesive disposed between the electrical insulating material and the surface(s) of the battery cell terminal. Suitable heat conductive adhesives include, thermally-conductive epoxies, room-temperature-vulcanizing rubbers, silicone rubbers, and thermally-conductive elastomeric gaskets, such as T-PLI® which is available from Thermagon (Cleveland, Ohio). Preferably, a layered insulating sleeve is also disposed on an outer surface of the conductor. Thus, the preferred layered sleeve includes a layer of the electrical insulation disposed between two layers of a thermally-conductive adhesive.

Reliability of the inventive method and apparatus is very high. Heat from any one battery cell can be conducted from either the positive or negative terminals or both, since both terminals are designed to have thermal conduction paths. Heat from a battery cell also can be conducted through the electrical leads adjacent to the cell terminals. Furthermore, heat also may be conducted through heavy electrical leads which connect terminals of adjacent cells and also act as good thermal conductors. Since each terminal is designed to accommodate a thermal conductor, each battery cell has four paths for heat to be conducted. In view of this quad redundancy and exceptional reliability, inexpensive heat pipes are ideal thermal conductors, especially where the battery is disposed adjacent a heat sink. Forced-fluid cooling loops may be used in place of heat pipes where the heat sink is remotely located with respect to the battery.

Referring now to the drawings wherein like reference numbers represent the same or similar elements in the various views, FIG. 1 illustrates a battery 10 having an outer casing 12 which envelops a cell 14 comprising multiple electrodes 15. The electrodes 15 are in contact with each of a positive and a negative cell terminal 16 and 18, respectively. Each terminal 16 and 18 is shown in thermal contact with a heat pipe 20 according to one embodiment of the invention. The heat pipe 20 contains a 90° bend 21, and a heat sink 22 in the form of a radiator fin.

Figure 2:
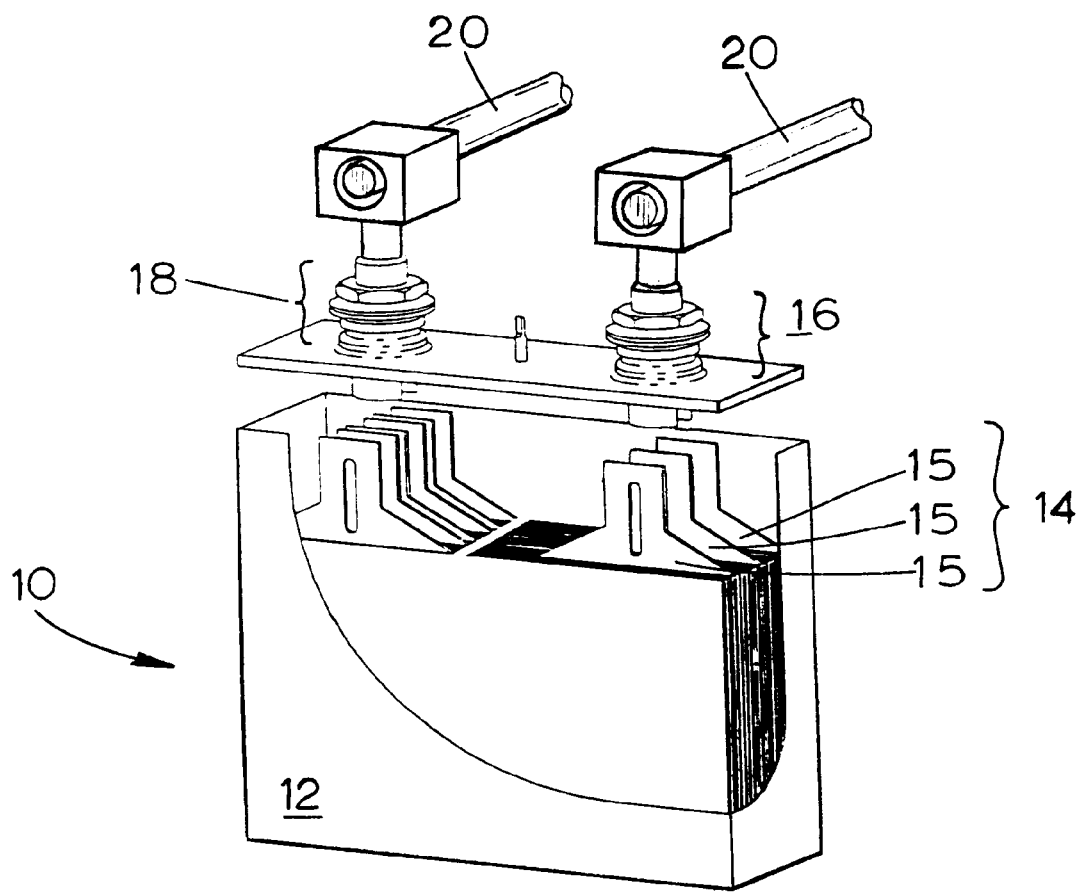
FIG. 2 is a partial, exploded view of an alternative heat control system according to the invention.

FIG. 2 illustrates the battery 10 of FIG. 1. In contrast to FIG. 1, the cell terminals 16 and 18 of the battery 10 in FIG. 2 are in thermal contact with a more lengthy heat pipe 20 (or forced-fluid loop). As discussed above, such a more lengthy heat pipe 20 (or forced-fluid loop) is useful to cool batteries not located near the heat sink.

Figure 3:
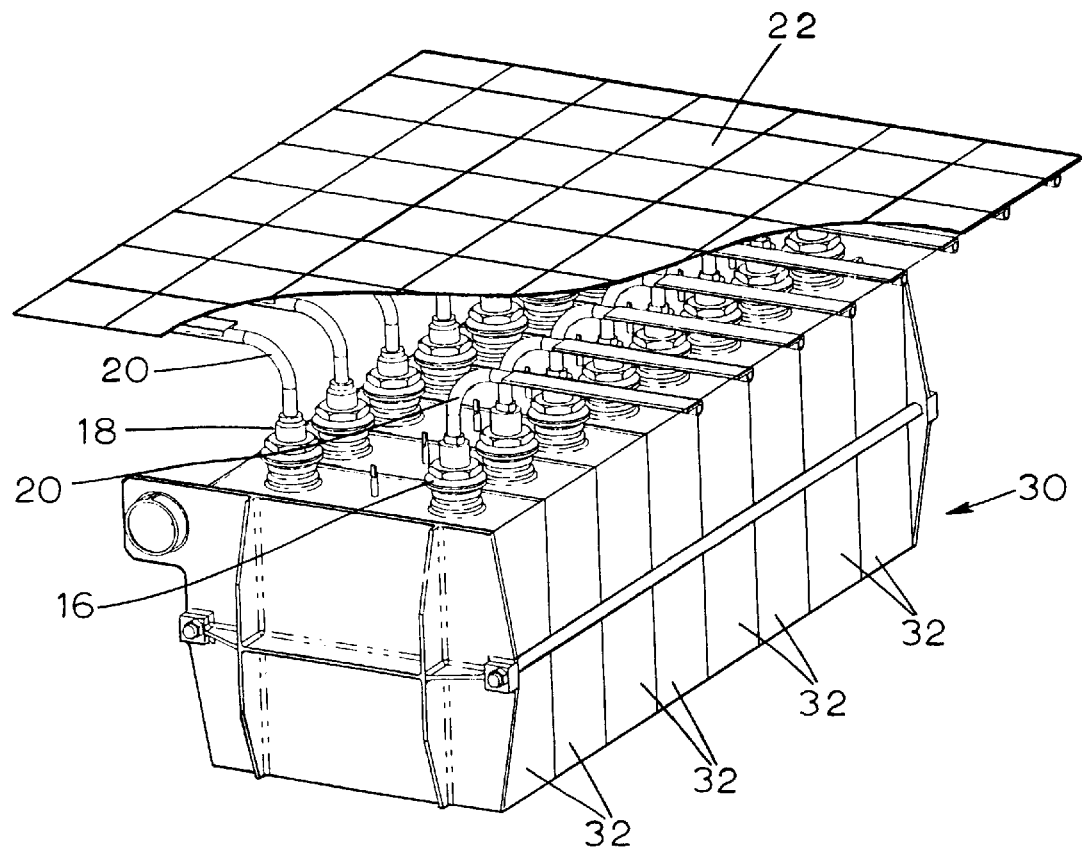
FIG. 3 is a perspective view of an alternative embodiment of the battery and heat control system shown in FIG. 1 showing a radiator; and, FIG. 4 is an enlarged, partial, and cross-sectional view of a layered insulating sleeve for use in connection with the inventive method and apparatus.

FIG. 3 illustrates a battery 30 comprising a plurality of cells 32, each of which has a positive and a negative terminal 16 and 18, respectively, in thermal contact with a heat pipe 20. As shown in FIG. 3, each heat pipe 20 is in thermal contact with a heat sink 22, shown in the form of a radiator plate.

Figure 4:
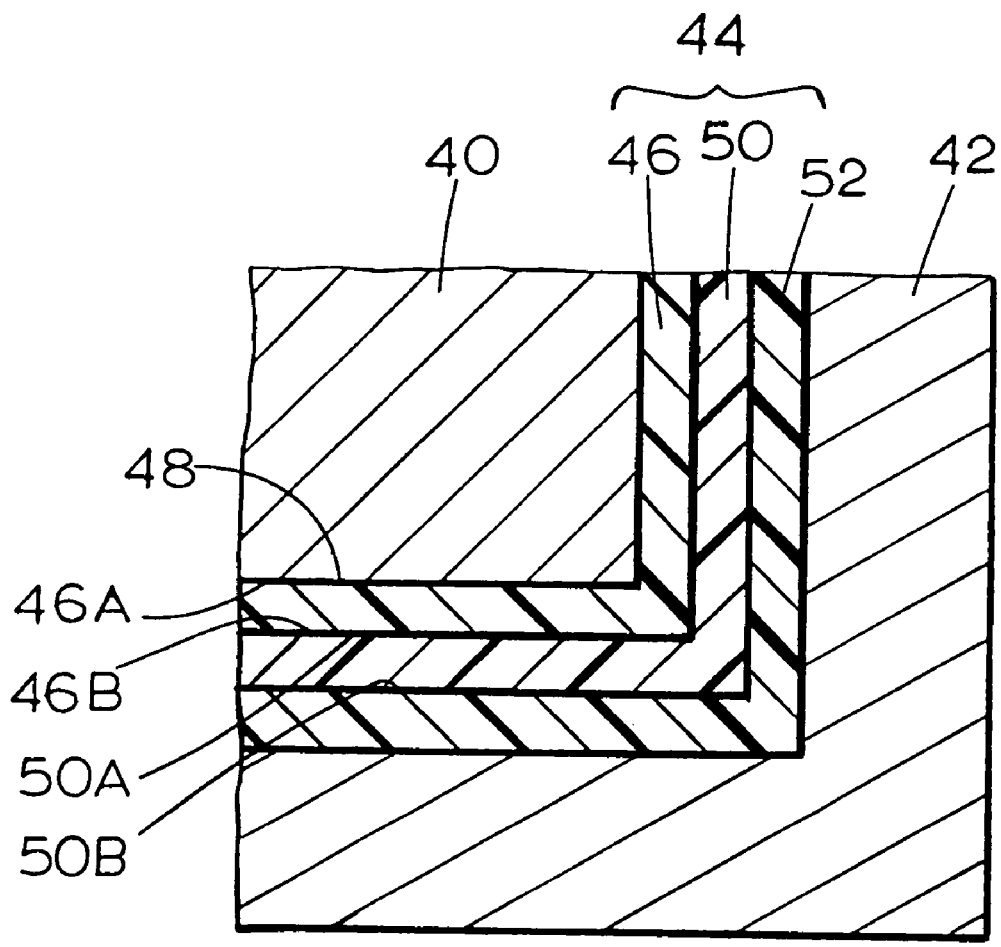

Shown in FIG. 4 is a partial, cross-sectional view of a thermal conductor 40 in thermal contact with a battery cell terminal 42. FIG. 4 illustrates a layered insulating sleeve 44 comprising a first layer 46 of thermally-conductive adhesive material disposed on an outer surface 48 of the conductor 40. The layered insulating sleeve 44 further comprises a layer of electrical insulation 50 and a second layer 52 of thermally-conductive adhesive material. An inner surface 46A of the first adhesive layer 46 contacts the outer conductor surface 48, while an outer surface 46B of the first adhesive layer 46 is in contact with an inner surface 50A of the electrical insulation layer 50. The second adhesive layer 52 is disposed about an outer surface 50B of the electrical insulation layer 50. The second adhesive layer 52 is in thermal contact with the battery cell terminal 42.

The foregoing description is given for clearness of understanding only, and no unnecessary limitations should be understood therefrom, as modifications within the scope of the invention will be apparent to those possessing ordinary skill in the art.

What is claimed is:

1. A method of transferring heat generated in a battery, the method comprising the steps of:

(a) providing a thermal conductor, the conductor disposed in thermal contact with at least one thermally-conductive battery cell terminal and a heat sink, wherein the thermal conductor is a heat pipe partially filled with a heat transfer fluid, and wherein the generated heat vaporizes a portion of the fluid and the heat sink condenses the vaporized fluid;

(b) operating the battery to generate heat; and (c) conducting the heat to the terminal(s); wherein the thermal conductor is electrically insulated from the terminal(s) and heat sink, and wherein the generated heat is conducted from the terminal(s) and through the conductor to the heat sink.

2. The method of claim 1, wherein the heat is generated in one or more of the following battery heat sources selected from the group consisting of a cell terminal, a relay, a bypass diode, a cell interconnect, and cell electronics for charge or discharge control or voltage conversion.

3. The method of claim 2, wherein the battery comprises multiple cells, each of said cells having positive and negative thermally-conductive battery cell terminals.

4. The method of claim 3, wherein each cell terminal is in thermal contact with at least two other cell terminals.

5. The method of claim 4, wherein the thermal conductor is in thermal contact with each thermally-conductive cell terminal.

6. The method of claim 1, wherein the heat transfer fluid is a material selected from the group consisting of ammonia and dichlorofluoromethane.

7. The method of claim 1, wherein the heat transfer fluid circulates within the heat pipe by action of pressure gradients formed by vaporization of the fluid and by action of capillary forces on condensed fluid.

8. The method of claim 1, wherein the heat sink is a radiator.

9. The method of claim 1, wherein the heat sink is remotely located with respect to the terminal(s).

10. The method of claim 1, wherein the heat sink is located adjacent the terminal(s).

11. The method of claim 1, wherein the battery is selected from the group consisting of lithium ion batteries, nickel-cadmium batteries, nickel-hydrogen batteries, and nickel-metal hydride batteries.

12. A method of transferring heat generated in a battery, wherein the battery comprises at least one thermally-conductive battery cell terminal, a heat pipe disposed in thermal contact with the terminal and a heat sink, the pipe being electrically insulated from the terminal and heat sink, and partially filled with a circulating heat transfer fluid, the method comprising the steps of:

(a) operating the battery to generate heat in the battery;

(b) passing the generated heat through the terminal, the generated heat vaporizing a portion of the circulating fluid; and, (c) allowing the vaporized fluid to flow along the pipe to a portion of the pipe in thermal contact with the heat sink, where the vaporized fluid condenses.

13. An apparatus for transferring heat generated in a battery, the battery comprising a battery cell, an outer casing around the battery cell, and at least one battery terminal extending through a wall of the outer casing, the battery terminal having an interior end within the outer casing and an exterior end outside the outer casing, the interior end of the battery terminal being in communication with the battery cell, wherein the apparatus for transferring heat generated in the battery comprises:

a heat sink; and a thermal conductor disposed entirely exterior to the outer casing of the battery, the thermal conductor having a first end in thermal communication with the exterior end of the battery terminal but electrically insulated from the exterior end of the battery terminal, and a second end in thermal communication with the heat sink, wherein the thermal conductor comprises a heat pipe partially filled with a heat transfer fluid, and wherein heat introduced into the thermal conductor at its first end from the battery terminal vaporizes a portion of the fluid, and the heat sink in thermal communication with second end of the thermal conductor condenses the vaporized fluid.

14. The apparatus of claim 13, wherein the battery comprises multiple battery cells.

15. The apparatus of claim 13, wherein there are at least two battery terminals, each in thermal communication with the first end of the thermal conductor.

16. The apparatus of claim 13, wherein the conductor is constructed from one or more materials selected from the group consisting of aluminum, iron, stainless steel, carbon steel, nickel, and copper.

17. The apparatus of claim 13, wherein the heat sink is remotely located with respect to the terminal(s).

* * * * *